United States Patent
Chauhan et al.

(10) Patent No.: US 12,288,151 B2
(45) Date of Patent: Apr. 29, 2025

(54) USING MACHINE LEARNING TO EXTRACT INFORMATION FROM ELECTRONIC COMMUNICATIONS

(71) Applicant: FETCH REWARDS, LLC, Chicago, IL (US)

(72) Inventors: Kumud Chauhan, Boston, MA (US); Ryan Harty, Old Lyme, CT (US); Jing Qian, Jersey City, NJ (US); Richard Vu, Pomona, CA (US)

(73) Assignee: Fetch Rewards, LLC, Chicago, IL (US)

( * ) Notice: Subject to any disclaimer, the term of this patent is extended or adjusted under 35 U.S.C. 154(b) by 7 days.

(21) Appl. No.: 18/234,768

(22) Filed: Aug. 16, 2023

(65) Prior Publication Data

US 2025/0061308 A1 Feb. 20, 2025

(51) Int. Cl.
| | |
|---|---|
| *G06Q 30/0202* | (2023.01) |
| *G06F 40/20* | (2020.01) |
| *G06F 40/295* | (2020.01) |
| *G06N 3/0455* | (2023.01) |
| *G06N 3/09* | (2023.01) |
| *G06Q 30/0207* | (2023.01) |

(52) U.S. Cl.
CPC ........... *G06N 3/0455* (2023.01); *G06F 40/20* (2020.01); *G06F 40/295* (2020.01); *G06N 3/09* (2023.01); *G06Q 30/0202* (2013.01); *G06Q 30/0225* (2013.01)

(58) Field of Classification Search
CPC ........ G06N 3/0455; G06F 40/20; G06F 40/00
See application file for complete search history.

(56) References Cited

U.S. PATENT DOCUMENTS

| | | | | |
|---|---|---|---|---|
| 2016/0321705 | A1* | 11/2016 | Scheidelman | G06F 40/20 |
| 2019/0367020 | A1* | 12/2019 | Yan | G06V 20/58 |
| 2020/0402230 | A1* | 12/2020 | Schmidt | G06V 10/776 |
| 2021/0027147 | A1* | 1/2021 | Baker | G06N 3/084 |
| 2021/0224858 | A1* | 7/2021 | Khoury | G06Q 30/0276 |
| 2021/0264316 | A1* | 8/2021 | Zhang | G06Q 10/063 |
| 2021/0326755 | A1* | 10/2021 | Hashimoto | G06N 20/00 |
| 2022/0050884 | A1* | 2/2022 | Sahu | G06N 5/04 |
| 2022/0343475 | A1* | 10/2022 | Zhang | A61B 5/055 |

(Continued)

OTHER PUBLICATIONS

HTML VR. Web classification approach using reduced vector representation model based on html tags. Journal of Theoretical and Applied Information Technology. Sep. 10, 2013;55(1). (Year: 2013).*

(Continued)

*Primary Examiner* — Oluwatosin Alabi
(74) *Attorney, Agent, or Firm* — Barnes & Thornburg LLP

(57) ABSTRACT

Systems and methods for using machine learning to extract data from electronic communications are disclosed. According to certain aspects, a machine learning model is trained on a set of tasks using a set of training data. An electronic communication indicating a purchase of a product and/or service is processed to generate augmented text that is input into the machine learning model. After analyzing the augmented text, the machine learning model outputs a set of predicted values for a set of defined categories, which an entity may use for various purposes such as to apply digital rewards to user accounts.

10 Claims, 9 Drawing Sheets

(56) References Cited

U.S. PATENT DOCUMENTS

| | | | |
|---|---|---|---|
| 2023/0022845 A1* | 1/2023 | Meng | G06Q 30/04 |
| 2023/0196195 A1* | 6/2023 | Hickie | G06N 20/00 |
| | | | 706/12 |
| 2024/0061835 A1* | 2/2024 | Subramanian | G06F 16/252 |

OTHER PUBLICATIONS

Lin, Xika, Xiufen Fu, Hidir Aras, and Shaohua Teng. "An approach of semi-supervised Web information extraction." (2008): 37-42. (Year: 2008).*

Xu et al. "LayoutLM: Pre-training of Text and Layout for Document Image Understanding" pp. 1-9.

Kim et al. "OCR-free Document Understanding Transformer" pp. 1-29.

* cited by examiner

310

<new_line> THANK YOU FOR YOUR <new_line> ORDER, JANE DOE <new_line> ORDER #9313 WAS PLACED <new_line> TUES, JUN 13, 2023 <new_line> FOR $10.70 <new_line> 2 <column> CHOCOLATE DIP <column> $2.58 <new_line> 1 <column> MEDIUM MOCHA ICED CAPP <column> $4.71 <new_line> 2 <column> HASHBROWN <column> $2.60 <new_line> SUBTOTAL <column> $9.89 <new_line> TAX <column> $0.81 <new_line> TOTAL <column> $10.70

FIG. 3B

| Input Tokens (315) | Token Predictions (320) |
|---|---|
| ORDER | {'token': 'ORDER', 'label': 'O'} |
| #9313 | {'token': '#9313', 'label': 'B-ORDERNUMBER'} |
| WAS | {'token': 'WAS', 'label': 'O'} |
| PLACED | {'token': 'PLACED', 'label': 'O'} |
| <new_line> | {'token': '<new_line>', 'label': 'O'} |
| TUES, | {'token': 'TUES', 'label': 'O'} |
| JUN | {'token': 'JUN', 'label': 'B-ORDERDATE'} |
| 13, | {'token': '13', 'label': 'I-ORDERDATE'} |
| 2023 | {'token': ' 2023', 'label': 'I-ORDERDATE'} |
| <new_line> | {'token': '<new_line>', 'label': 'O'} |
| FOR | {'token': ' FOR', 'label': 'O'} |
| $10.70 | {'token': '$10.70', 'label': 'B-ORDERTOTAL'} |
| <new_line> | {'token': '<new_line> ', 'label': 'O'} |
| 2 | {'token': ' 2', 'label': 'B-QUANTITY'} |
| <column> | {'token': ' <column>', 'label': 'O'} |
| CHOCOLATE | {'token': 'CHOCOLATE ', 'label': 'B-PRODUCTNAME'} |
| DIP | {'token': 'DIP', 'label': 'I-PRODUCTNAME'} |
| <column> | {'token': '<column>', 'label': 'O'} |
| $2.58 | {'token': '$2.58', 'label': 'B-UNITPRICE'} |
| <new_line> | {'token': '<new_line>', 'label': 'O'} |
| 1 | {'token': '1', 'label': 'B-QUANTITY'} |
| <column> | {'token': '<column>', 'label': 'O'} |
| MEDIUM | {'token': 'MEDIUM', 'label': 'B-PRODUCTNAME'} |
| MOCHA | {'token': 'MOCHA', 'label': 'I-PRODUCTNAME'} |
| ICED | {'token': 'ICED', 'label': 'I-PRODUCTNAME'} |
| CAPP | {'token': 'CAPP', 'label': 'I-PRODUCTNAME'} |
| <column> | {'token': '<column>', 'label': 'O'} |
| $4.71 | {'token': '$4.71', 'label': 'B-UNITPRICE'} |
| <new_line> | {'token': '<new_line>', 'label': 'O'} |
| 2 | {'token': '2', 'label': 'B-QUANTITY'} |
| <column> | {'token': '<column>', 'label': 'O'} |
| HASHBROWN | {'token': 'HASHBROWN', 'label': 'B-PRODUCTNAME'} |
| <column> | {'token': '<column>', 'label': 'O'} |
| $2.60 | {'token': '$2.60', 'label': 'B-UNITPRICE'} |
| <new_line> | {'token': '<new_line>', 'label': 'O'} |
| SUBTOTAL | {'token': 'SUBTOBAL', 'label': 'O'} |
| <column> | {'token': '<column>', 'label': 'O'} |
| $9.89 | {'token': '$9.89', 'label': 'B-ORDERSUBTOTAL'} |
| <new_line> | {'token': '<new_line>', 'label': 'O'} |
| TAX | {'token': 'TAX', 'label': 'O'} |
| <column> | {'token': '<column>', 'label': 'O'} |
| $0.81 | {'token': '$0.81', 'label': 'B-ORDERTAXES'} |
| <new_line> | {'token': '<new_line>', 'label': 'O'} |
| TOTAL | {'token': 'TOTAL', 'label': 'O'} |
| <column> | {'token': '<column>', 'label': 'O'} |
| $10.70 | {'token': '$10.70', 'label': 'B-ORDERTOTAL'} |

Post-processing output
'receiptID': "609999",
    'digitalReceiptOrderStatus': 'Ordered',
    'digitalReceiptType': 'EMAIL',
    'digitalReceiptOrderNum': '#9313',
    'storeName': 'BREWTOPIA',
    'receiptDate': '06/13/2023', — 326
    'total': 10.70
    'subtotal': 9.89
    'taxes': 0.81
    'products':
        [{'productNumber': '',
            'productDescription': 'CHOCOLATE DIP',
            'unitOfMeasure': '',
            'quantity': 2.0,
            'unitPrice': 1.29,
            'totalPrice': 2.58,
            'lineNumber': 0}
        {'productNumber': '',
            'productDescription': 'MEDIUM MOCHA ICED CAPP',
            'unitOfMeasure': '',
327        'quantity': 1.0,
            'unitPrice': 4.71,
            'totalPrice': 4.71,
            'lineNumber': 0}
        {'productNumber': '',
            'productDescription': 'HASHBROWN',
            'unitOfMeasure': '',
            'quantity': 2.0,
            'unitPrice': 1.30,
            'totalPrice': 2.60,
            'lineNumber': 0}]

FIG. 3D

USING MACHINE LEARNING TO EXTRACT INFORMATION FROM ELECTRONIC COMMUNICATIONS

FIELD

The present disclosure is directed to improvements related to data extraction. More particularly, the present disclosure is directed to platforms and technologies for using machine learning techniques to extract data from electronic communications associated with the purchase of products and/or services.

BACKGROUND

Computer-supported data extraction, which involves using algorithms and software to automatically pull relevant information from various digital sources, is a vital tool in numerous fields such as healthcare, business intelligence, and academic research, where it aids in transforming unstructured data into structured formats, enabling insightful analysis, predictions, and decision-making. Optical Character Recognition (OCR) is an existing data extraction technology that converts different types of documents, such as scanned paper documents, electronic communications such as e-receipts, PDF files, or images captured by a digital camera, into editable and searchable data. OCR generally involves a combination of artificial intelligence, computer vision, and pattern recognition to translate images of text into machine-encoded text.

However, these conventional technologies such as OCR have several drawbacks. For example, OCR techniques struggle with handling complex layouts, such as in interpreting documents with multiple columns, embedded images, or unusual text layouts. This can be particularly relevant in the case of e-receipts that have varying layouts. Additionally, OCR techniques generally lack the ability to understand context, and may expose sensitive information, especially if appropriate security measures are not in place. Moreover, OCR and other techniques such as hard-coded heuristics require significant processing power and/or are difficult to update and/or improve.

Accordingly, there is an opportunity for platforms and technologies to efficiently and effectively extract data from electronic documents.

SUMMARY

In an embodiment, a computer-implemented method of using machine learning to extract data from electronic communications is provided. The computer-implemented method may include: training, by at least one processor using a set of training data, a machine learning model, wherein the set of training data comprises a set of training electronic communications labeled with a set of training tags; accessing, by the at least one processor, an electronic communication (i) indicating a purchase of a product or service by an individual, and (ii) comprising a set of tags; processing, by the at least one processor, the electronic communication to (i) remove a portion of the set of tags, and (ii) replace another portion of the set of tags with a set of designated tags; and analyzing, by the machine learning model that was trained, the electronic communication that was processed to output a set of predicted values for a set of defined categories associated with the purchase of the product or service by the individual.

In another embodiment, a system for using machine learning to extract data from electronic communications is provided. The system may include: a memory storing a set of computer-readable instructions and a machine learning model; and one or more processors interfaced with the memory, and configured to execute the set of computer-readable instructions to cause the one or more processors to: train, using a set of training data, the machine learning model, wherein the set of training data comprises a set of training electronic communications labeled with a set of training tags, access an electronic communication (i) indicating a purchase of a product or service by an individual, and (ii) comprising a set of tags, process the electronic communication to (i) remove a portion of the set of tags, and (ii) replace another portion of the set of tags with a set of designated tags, analyze, by the machine learning model that was trained, the electronic communication that was processed to output a set of predicted values for a set of defined categories associated with the purchase of the product or service by the individual.

Further, in an embodiment, a non-transitory computer-readable storage medium configured to store instructions executable by one or more processors is provided. The instructions may include: instructions for training, using a set of training data, a machine learning model, wherein the set of training data comprises a set of training electronic communications labeled with a set of training tags; instructions for accessing an electronic communication (i) indicating a purchase of a product or service by an individual, and (ii) comprising a set of tags; instructions for processing the electronic communication to (i) remove a portion of the set of tags, and (ii) replace another portion of the set of tags with a set of designated tags; and instructions for analyzing, by the machine learning model that was trained, the electronic communication that was processed to output a set of predicted values for a set of defined categories associated with the purchase of the product or service by the individual.

BRIEF DESCRIPTION OF THE FIGURES

FIGS. 3A-3D depict example iterations of data at various stages of processing, in accordance with some embodiments.

DETAILED DESCRIPTION

Figure 1A:
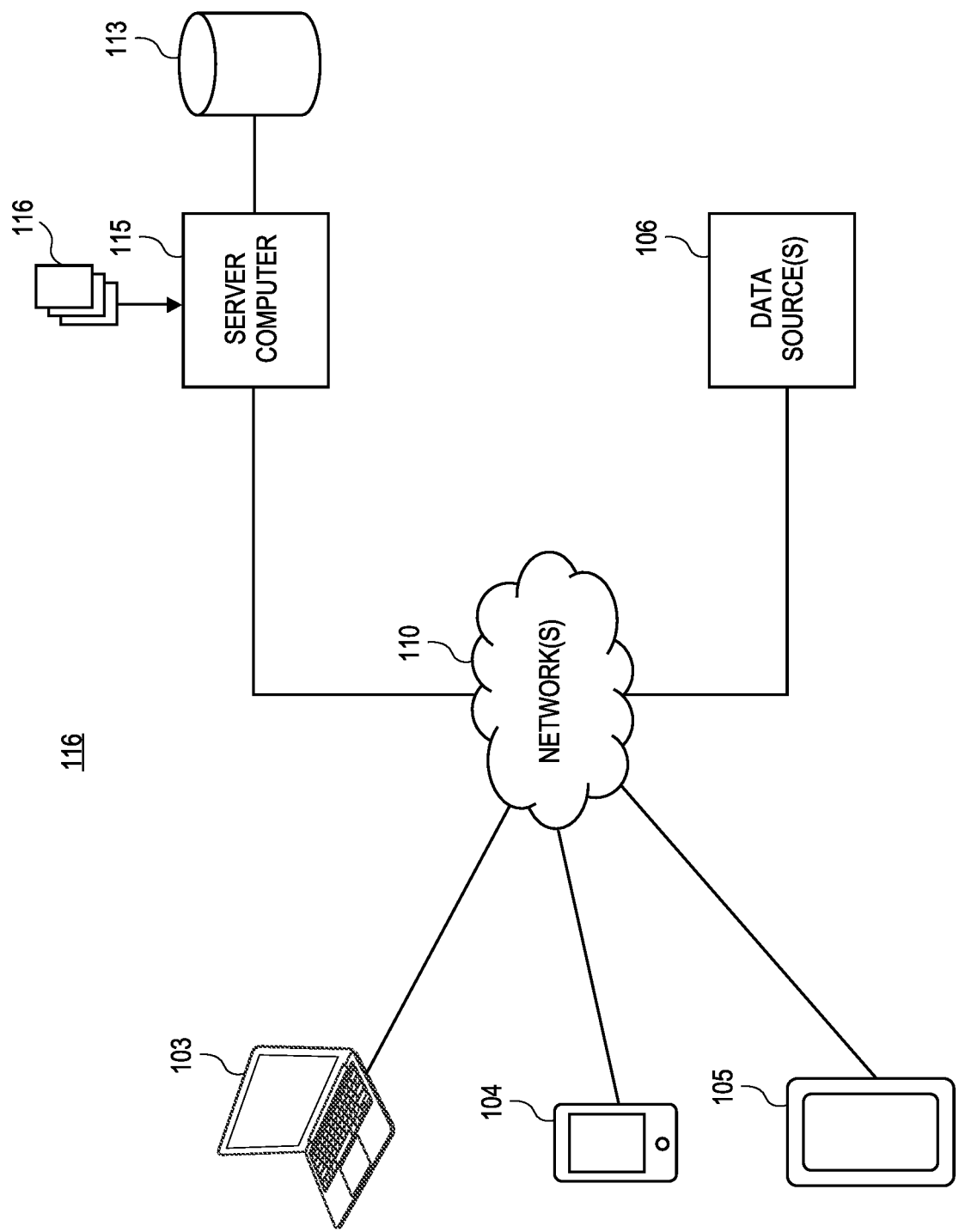
FIG. 1A depicts an overview of components and entities associated with the systems and methods, in accordance with some embodiments.

The present embodiments may relate to, inter alia, using machine learning techniques to extract data and information from electronic communications. According to certain aspects, the electronic communications may be associated with the purchase of a set of products and/or services by an individual. The data contained in such electronic communications may be important to various stakeholders, as it may provide meaningful business intelligence that leads to more strategic and informed decision-making across various facets of an entity's operations.

In particular, this data may reveal patterns in customer purchasing behavior, such as when they buy, what they buy, and how often they buy, which may help in segmenting customers, personalizing marketing efforts, and predicting future buying patterns. Further, purchase confirmations can provide real-time data on which products are selling and how fast, which can be used for effective inventory management. Additionally, the data can contribute to revenue forecasting, and aid in budgeting and financial planning, where insights can be derived regarding which products are popular or unpopular, guiding future product development and improvements. Moreover, customer purchase history can enable an entity to provide personalized customer service and nurture relationships, and can lead to additional post-purchase marketing strategies.

Electronic communications (e.g., emails) that detail product and/or service purchases may be in HTML (HyperText Markup Language) format. Generally, HTML is the standard language for creating web pages, where HTML tags are the coded instructions that define how web browsers should format and display the content. An HTML tag may be generally referred to herein as a "tag." Each tag indicates a different element, such as a paragraph, an image, a hyperlink, or a heading, among others. HTML tags are typically used in pairs, consisting of an opening tag (e.g., <p>) and a closing tag (e.g., </p>), which indicate the start and the end of an element, respectively.

Electronic communications such as emails contain HTML tags to structure and style the content of the electronic communications. In particular, HTML supports rich formatting that enables different fonts, colors, and styles, as well as the embedding of images, tables, lists, and links. Further, HTML enables the sender to control the layout of the email, which may be particularly important for marketing and transactional emails where presentation and branding can greatly influence the perception and response by the recipient. Additionally, HTML can include interactive elements like forms and buttons, which can be useful for gathering feedback, conducting surveys, or providing interactive services directly within the email. Accordingly, certain electronic communications may include an abundance of tags, as well as many different types of tags, that may not be particularly relevant to the content included in the electronic communications.

There are some existing technologies for extracting data from electronic communications, however these existing technologies are cumbersome, limited, difficult to update, and/or utilize a large amount of resources. In particular, some existing technologies rely on hard-coded heuristics and parsers to directly extract information from documents, which limits the types of information that may be extracted, can be inaccurate, and are cumbersome to update. Additional techniques employ OCR which has many limitations and drawbacks. For example, data extraction accuracy can be compromised if the quality of the document is low; OCR techniques struggle to maintain the original formatting of a document, as OCR may fail to recognize tables, columns, and other formatting elements; OCR techniques struggle with uncommon or complex fonts (e.g., script fonts), as well as with symbols, emoticons, and other unique characters often found in emails and other types of electronic communications; OCR techniques can be time and resource-intensive, especially when high levels of accuracy are required; extracting information from emails using OCR techniques can raise privacy and legal concerns; and OCR techniques struggle to process text contained in images.

While some existing OCR techniques incorporate machine learning aspects, these techniques involve complex data processing along with the training and use of multiple machine learning models. In particular, these OCR techniques require preprocessing steps such as image binarization, noise removal, and skew correction, among others, along with bounding box recognition and relevant text identification. Further, these techniques involve information extraction using a specific machine learning model, such as the LayoutLM model, which depends on certain types of information like layout information. Additionally, these techniques incorporate various post-processing functionality to clean up the extracted data, as well as use heuristics or another machine learning model to group any predicted line-item level entities.

The described embodiments represent an improvement to these existing technologies. In particular, the machine learning techniques employed by the described embodiments do not incorporate OCR techniques and therefore are not limited by the data processing requirements of these techniques. Further, aspects of the described embodiments incorporate a single machine learning model which is more efficient and less resource-intensive than solutions that incorporate multiple machine learning models. Additionally, the described embodiments directly access and analyze electronic communications (e.g., emails), instead of first converting electronic communications into images and processing the images. This enables the described embodiments to process these electronic communications in certain formats (e.g., HTML) and provide results in real-time or near-real-time. Therefore, the described embodiments reduce processing resources, decrease processing time, and decrease bandwidth requirements, among other benefits. Additionally, the embodiments retrain the machine learning model using output data, which improves the accuracy and efficiency of subsequent analyses.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 103, 104, 105 which may be used or operated by a set of users, such as any individual or person who may be interested in purchasing items, products, and/or services that may be offered for sale by an entity. In an embodiment, the entity may be a corporation, company, partnership, retailer, wholesaler operating on behalf of another entity (e.g., a white label wholesaler), or the like, where the entity may offer an ecommerce platform (e.g., a website accessible by or an application executable by the electronic devices 103, 104, 105) and optionally a set of brick-and-mortar retail stores. Each of the electronic devices 103, 104, 105 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like.

The electronic devices 103, 104, 105 may communicate with a server computer 115 via one or more networks 110. The server computer 115 may be associated with an entity (e.g., a corporation, company, partnership, or the like) that may process information associated with product and/or service purchases made by users, and may manage and facilitate digital rewards for the users, such as the set of users associated with the electronic devices 103, 104, 105. In particular, the server computer 115 may include or support a web server configured to host a website which with the electronic devices 103, 104, 105 may interface, such as to communicate indications of the purchase of any products and/or services, to receive reviews for the products and/or services, and/or to present a set of digital offers related to a set of products. For instance, a set of users of the set of electronic devices 103, 104, 105 may capture one or more digital images (e.g., using an image sensor of the electronic devices 103, 104, 105) of a receipt(s) indicating a set of products and/or services that were purchased by the users, either within a brick and mortar store or via an ecommerce platform, or another purchasing channel.

Further, the server computer 115 may support a software application executable by the set of electronic devices 103, 104, 105 (i.e., the set of electronic devices 103, 104, 105 may interface with the server compute 115 in executing the software application), where the user may use the software application to review or communicate information indicative of product/service purchases. Additionally, the users of the electronic devices 103, 104, 105 may have an account with a service or application offered by the server computer 115. In embodiments, the network(s) 110 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

The server computer 115 may be configured to interface with or support a memory or storage 113 capable of storing various data, such as in one or more databases or other forms of storage. According to embodiments, the storage 113 may store data or information associated with any products or services that are offered for sale by an entity, including any purchase history(ies) of a set of users, any reviews of products/services provided by users, and/or other data.

The server computer 115 may communicate with one or more data sources 106 via the network(s) 110. In embodiments, the data source(s) 106 may be associated with any company involved in the development, manufacture, distribution, and/or sales of one or more products and/or services. For example, a given company may be a CPG company, private label brand company, direct-to-consumer (DTC) company, e-commerce marketplace provider, local/specialty retailer, service provider, and/or the like.

According to embodiments, the server computer 115 may generate or otherwise access a set of training data 116 that may include a set of electronic communications indicating a set of product and/or service purchases. Further, the server computer 115 may use the set of training data 116 and employ one or more techniques to train one or more machine learning models that reflect relevant content of the set of electronic communications. The server computer 115 may store data associated with training the machine learning model(s) and with the trained machine learning model(s) in the storage 113. Further, the storage 113 may store electronic communications indicating purchase histories of a set of users, such as the set of users associated with the electronic devices 103, 104, 105.

Generally, a user associated with one of the electronic devices 103, 104, 105 may purchase a product or service offered by a company associated with the data source 106 via some sort of ecommerce platform (e.g., social media application or other application, website, etc.), where the data source 106 may log or record that purchase. In embodiments, the purchase may be reflected in an electronic communication such as an email or other type of communication that is generated by the data source 106 or by a third party source. The data source 106 (or the third party source) may transmit the electronic communication to the server computer 115, or the server computer 115 may retrieve the electronic communication from the data source 106 (or the third party source).

According to embodiments, the server computer 115 may analyze and process the electronic communication. In particular, the server computer 115 may preprocess the electronic communication to generate augmented text input. Further, the server computer 115 may input the augmented text input into the trained machine learning model, which may output relevant information that is included in the electronic communication. Additional details regarding these functionalities is further discussed with respect to FIGS. 1B and 2.

Although depicted as a single server computer 115 in FIG. 1A, it should be appreciated that the server computer 115 may be in the form of a distributed cluster of computers, servers, machines, cloud-based services, or the like. In this implementation, the distributed server computer(s) 115 may be utilized as part of an on-demand cloud computing platform. Accordingly, when the electronic devices 103, 104, 105 interface with the server computer 115, the electronic devices 103, 104, 105 may actually interface with one or more of a number of distributed computers, servers, machines, or the like, to facilitate the described functionalities.

Figure 1B:
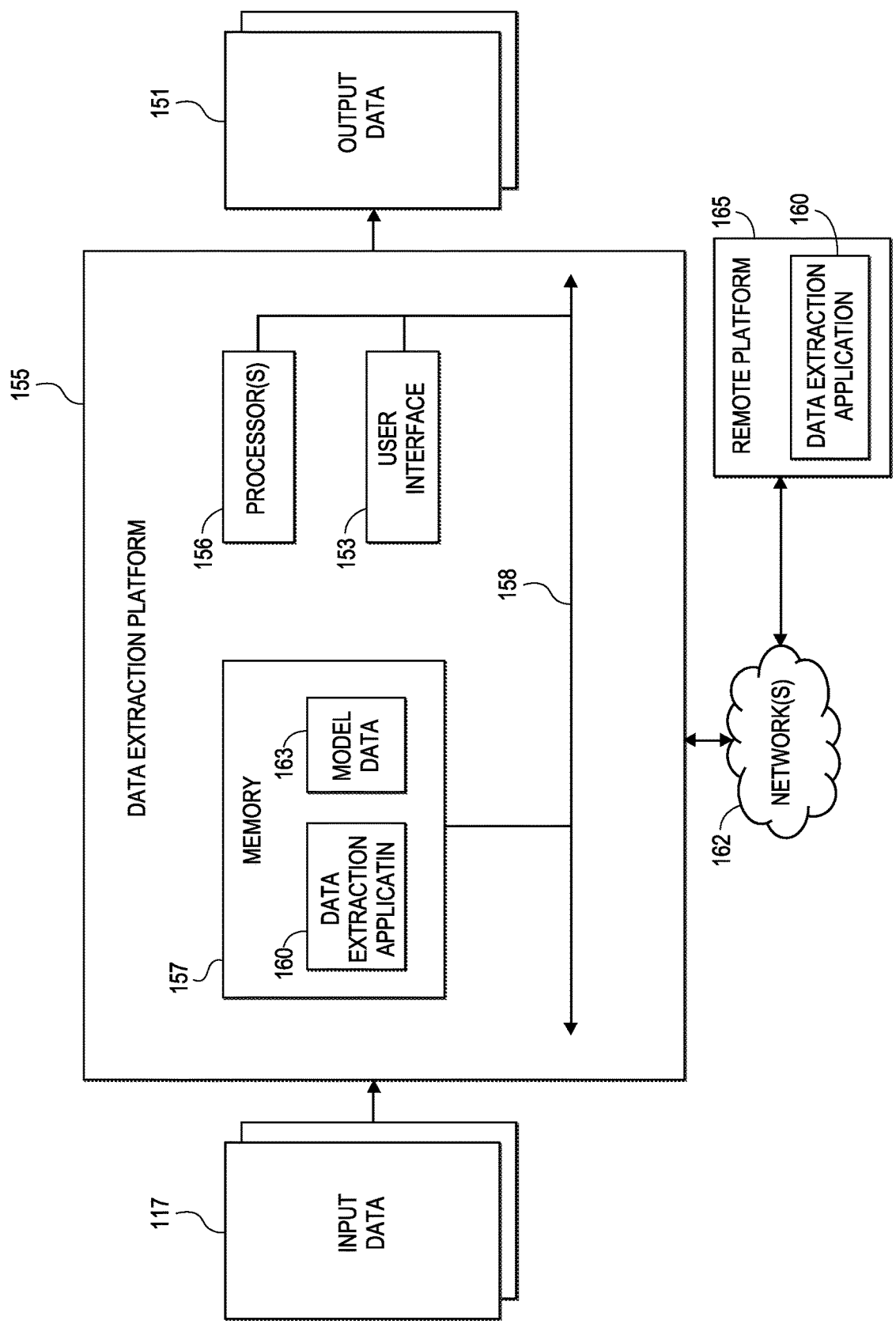
FIG. 1B depicts an overview of certain components configured to facilitate the systems and methods, in accordance with some embodiments.

Further, although three (3) electronic devices 103, 104, 105, and one (1) server computer 115 are depicted in FIG. 1A, it should be appreciated that greater or fewer amounts are envisioned. For example, there may be multiple server computers, each one associated with a different entity. FIG. 1B depicts more specific components associated with the systems and methods.

FIG. 1B an example environment 150 in which input data 117 is processed into output data 151 via a data extraction platform 155, according to embodiments. The data extraction platform 155 may be implemented on any computing device or combination of computing devices, including the server computer 115 and/or any of the electronic devices 103, 104, 105, as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The data extraction platform 155 may further include a user interface 153 configured to present content (e.g., input data, output data, digital offer data, and/or other information). Additionally, a user may review results of a digital offer determination and make selections to the presented content via the user interface 153, such as to review output data presented thereon, make selections, and/or perform other interactions. The user interface 153 may be embodied as part of a touchscreen configured to sense touch interactions and gestures by the user. Although not shown, other system components communicatively coupled to the system bus 158 may include input devices such as cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a data extraction application 160), data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156.

The data extraction platform 155 may operate in a networked environment and communicate with one or more remote platforms, such as a remote platform 165, via a network(s) 162, such as a local area network (LAN), a wide area network (WAN), or other suitable network. The platform 165 may be implemented on any computing device, including any of the set of electronic devices 103, 104, 105 as discussed with respect to FIG. 1A, and may include many or all of the elements described above with respect to the platform 155. In some embodiments, the data extraction application 160 as will be further described herein may be stored and executed by the remote platform 165 instead of by or in addition to the platform 155.

Generally, each of the input data 117 and the output data 151 may be embodied as any type of electronic communication, document, file, template, etc., that may include various graphical/visual and/or textual content, and may be stored in memory as program data in a hard disk drive, magnetic disk and/or optical disk drive in the data extraction platform 155 and/or the remote platform 165. The data extraction platform 155 may support one or more techniques, algorithms, or the like for analyzing the input data 117 to generate the output data 151. In particular, the data extraction application 160 may access various product and/or service purchase data to train and use a machine learning model. The memory 157 may store the output data 151 and other data that the data extraction platform 155 generates or uses in association with the analysis of the input data 117.

According to embodiments, the data extraction application 160 may employ various machine learning and artificial intelligence techniques such as, for example, a regression analysis (e.g., a logistic regression, linear regression, random forest regression, probit regression, or polynomial regression), classification analysis, k-nearest neighbors, decisions trees, random forests, boosting, neural networks, support vector machines, deep learning, reinforcement learning, Bayesian networks, or the like. Various of these machine learning techniques are further described with respect to FIG. 2.

When the input data 117 is a training dataset, the digital offer application 160 may analyze/process the input data 117 to generate and/or train a machine learning model(s) for storage as part of model data 163 that may be stored in the memory 157. In embodiments, various of the output data 151 may be added to the machine learning model stored as part of the model data 163. Therefore, in analyzing or processing the input data 117, the data extraction application 160 may use any of the output data 151 previously generated by the data extraction platform 155.

The data extraction application 160 (or another component) may cause the output data 151 (and, in some cases, the training or input data 117) to be displayed on the user interface 153 for review by the user of the data extraction platform 155. Additionally, the data extraction application 160 may analyze or examine the output data 151 to determine or assess any digital rewards associated with product and/or service purchases, which may be displayed on the user interface 153 as part of a dashboard, interface, or the like.

Figure 2:
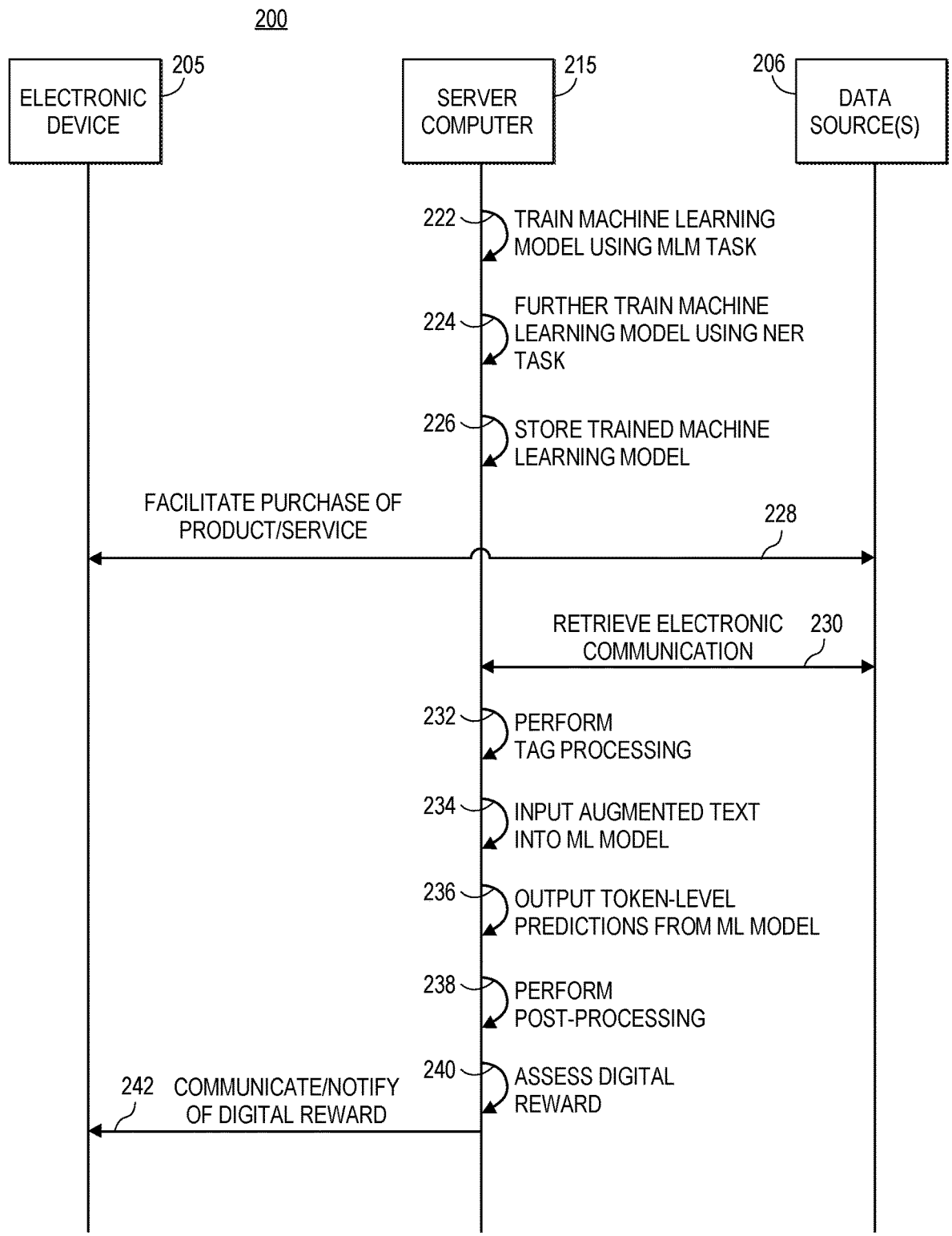
FIG. 2 depicts an example signal diagram detailing data extraction functionalities, in accordance with some embodiments.

FIG. 2 depicts a signal diagram 200 including various functionalities associated with the described embodiments. The signal diagram 200 may include an electronic device 205 (such as one of the electronic devices 103, 104, 105 as described with respect to FIG. 1A), a server computer 215 (such as the server computer 115 as described with respect to FIG. 1A), and a data source 206 (such as the data source(s) 106 as described with respect to FIG. 1A). Although a single electronic device is depicted in and described with respect to FIG. 2, it should be appreciated that multiple electronic devices that may each interface with the server computer 215 are envisioned.

The signal diagram 200 may begin at 222 when the server computer 215 initially trains a machine learning model using a Masked Language Modeling (MLM) task. In embodiments, the machine learning model may be a language model that uses a transformer architecture. Generally, a language model is a type of machine learning model that is trained to understand or generate human language, whereby it learns to predict the next word in a sequence given the context of the previous words, thus enabling it to generate human-like text. Further, a transformer architecture is characterized by the use of self-attention mechanisms and position-wise feed-forward networks. The self-attention mechanisms enable the language model to consider different words in the input when producing an output word, and the position-wise feed-forward networks help process each position (i.e., word) independently while maintaining their order.

It should be appreciated that the server computer 215 may train the machine learning model using a set of training data that includes labeled electronic communications (e.g., e-receipts that may be included in emails). In particular, the labels may contain designated tags or tokens that may correspond to HTML tags. Each of the set of designated tags or tokens may be a special markup tag that may be referred to herein as a "designated tag." For example, one label may be the designated tag "<new_line>" and another label may be the designated tag "<column>". The labeled electronic communications may include additional textual content that identifies and/or describes products and/or services that are purchased. In embodiments, the server computer 215 (or another component) may generate the labels for the set of labeled electronic communications using the tag processing techniques as described with respect to (232) as discussed herein.

Generally, MLM is a training technique used to teach the language model the statistical properties of language as well as some semantic and syntactic understanding of the text. In particular, some percentage of input words are randomly masked, where the objective is to predict these masked words based on the context provided by the non-masked words. For example, for the sentence "The cat sat on the mat", an MLM task might mask the sentence to produce "The cat sat on the _____". The language model may then predict the masked word ("mat" in this case) using the context of the non-masked words ("The cat sat on the").

The MLM technique results in the machine learning model gaining a bidirectional understanding of language, thus enabling the machine learning model to learn from both the left and right context of a word. Further, the MLM technique enables the machine learning model to learn deep representations of language that are useful across a wide range of downstream tasks. Generally, once the machine learning model has been trained using an MLM task, it can be fine-tuned on a specific task like text classification, sentiment analysis, or named entity recognition with relatively little additional data.

The server computer 215 may further train (224) the machine learning model using a Named Entity Recognition (NER) task, such as to enable the machine learning model to learn which words correspond to which class/entity. Generally, an NER task is a subtask of information extraction that seeks to locate and classify named entities in text into predefined labels. For example, the predefined labels may be "ORDERNUMBER," "ORDERDATE," "PRODUCT-NAME," "UNIT PRICE," "QUANTITY," and/or others.

To facilitate the NER task, the server computer 215 may train the machine learning model on a smaller, task-specific dataset where each named entity in the text is labeled with its corresponding label. In using the NER task, the machine learning model learns to predict these labels and essentially becomes a text classifier where it classifies each word (or token) in the text as being a particular type of named entity or not being a named entity at all. By employing the MLM task of (222) and the NER task of (224), the machine learning model may leverage a large amount of unlabeled data to learn a relevant representation of language during the MLM task, and be fine-tuned on a more specific task with a smaller amount of labeled data during the NER task.

The server computer 215 may store (226) the trained machine learning model in memory, such as in the database 113 as described with respect to FIG. 1A. Accordingly, the server computer 215 may access the trained machine learning model for subsequent analyses.

Independent of the server computer 215 training and storing the machine learning model, the electronic device 205 may facilitate a purchase of a product or service with the data source 206. In particular, a user may use the electronic device 205 to purchase a product or service via an ecommerce platform (e.g., an application, a website, or the like) associated with the data source 206. In response to the product or service being purchased, the data source 206 may generate an electronic communication (e.g., a confirmation email) that indicates and/or describes the purchase of the product or service.

According to embodiments, the electronic communication may be in HTML format having one or more components. In particular, the electronic communication in HTML format may include one or more of the following tags:

<tr>: This tag defines a row in an HTML table, where each <tr> element contains one or more <td> or <th> elements which represent the cells in the row.

<br>: The Break tag inserts a line break in text and is an empty element which means it does not have a closing tag.

<div>: The Division tag is a container unit that encapsulates other page elements and divides the HTML document into sections.

<td>: The table data tag identifies a cell of a table that contains data, and may exist only inside a <tr> element.

<span>: This tag is used to group inline elements in a document.

<script>: The Script tag is used to embed or reference JavaScript code within an HTML document. Scripts may be placed in the <body>, or in the <head> section of an HTML page, or in both.

<style>: This tag is used to contain style information for a document, or part of a document. It is typically placed inside the <head> tag but can appear in the body of the document as well.

<area>: This tag defines an area inside an image-map (an image with clickable areas) and may be nested inside a <map> tag.

<link>: This tag defines the relationship between the current document and an external resource, and may be used to link a stylesheet (CSS) to the HTML document.

<meta>: This tag provides metadata about the HTML document. Meta elements are typically used to specify page description, keywords, author, last modified, and other metadata. The metadata can be used by browsers (how to display content or reload page), search engines (keywords), or other web services.

<img>: This tag embeds an image into an HTML document. It has several attributes like src (which defines the source URL of the image), alt (which specifies an alternate text to be displayed if the image cannot be loaded), height and width (which provide the dimensions of the image).

It should be appreciated that the electronic communication may include alternative and/or additional tags.

The server computer 215 may retrieve (230) the electronic communication from the data source 206, where the electronic communication may include content in HTML format. In some embodiments, the data source 206 may automatically provide the electronic communication to the server computer 215, such as in response to the user of the electronic device 205 completing the purchase of the product/service.

The server computer 215 may perform (232) tag processing on the electronic communication. According to embodiments, the server computer 215 may employ an HTML parser (e.g., Beautiful Soup) to extract data from the electronic document. Initially, the HTML parser may read the electronic document character by character, and identify tags, attributes, and text, based on the standard HTML syntax. Next, as the electronic communication is tokenized, the HTML parser may build a data structure (e.g., a parse tree or a Document Object Model (DOM)) that represents the nested and hierarchical structure of the electronic document. The data structure may be structured such that each HTML tag corresponds to a node in the tree, and the relationships between tags (such as one tag being nested inside another) correspond to relationships between nodes (such as parent-child relationships). The data structure may be searched to extract information (e.g., finding all instances of a tag, finding the children or parents of a node, and/or finding a node that matches certain attributes).

In performing the tag processing, the server computer 215 may further generate an augmented text input that preserves a set of specific HTML tags. In particular, the server computer 215 may initially remove any unnecessary information such as CSS styling from the electronic communication, after which document-style formatting may remain.

Additionally, the server computer 215 may replace some HTML tags and remove other HTML tags. For example, the server computer 215 may identify certain tags as being replaceable (e.g., <tr>, <br>, <div>, <td>, <span>, and/or others), and certain tags as being removable (e.g., <script>, <style>, <comment>, <area>, <link>, <meta>, <img>, and/or others). Additionally, the server computer 215 may identify or create a set of designated tokens or tags that the server computer 215 may use to replace the replaceable tags. For example, the set of designated tokens or tags may be <new_line> and <column>, although it should be appreciated that alternative or additional designated tags are envisioned. Thus, the server computer 215 may preserve the high-level document and tabular structure of the electronic communication by replacing the replaceable tags (e.g., <tr>, <br>, <div>, <td>, <span>) with the set of designated tags (e.g., <new_line> and <column>), and removing any less important or empty HTML tags (e.g., <script>, <style>, <comment>, <area>, <link>, <meta>, <img>). This may enable the preservation of at least some of the visually-rich information, which provides the machine learning model with additional information from which to learn the different formats of different electronic communications.

Further, the server computer 215 may be configured to condense or consolidate consecutive designated tags, such that the input to the machine learning model is not unnecessarily long, and because language model training and inference time directly depend on sequence length. For example, the server computer 215 may replace tags <tr>, <p>, and <div> with respective designated tags <new_line>, <new_line>, and <new_line>, and may additionally remove two of the <new_line> tags such that one <new_line> tag remains. Generally, the information that remains after the tag processing of (232) may be referred to as "augmented text" that may be in the form of a series of input tokens.

The server computer 215 may input (234) the augmented text into the trained machine learning model. Generally, the trained machine learning model may analyze the augmented text to determine information that is standard, common, or relevant to the purchase of the product(s) and/or service(s) as indicated in the electronic communication. Thus, the server computer 215 may output (236) token-level predictions from the machine learning model, where the token-level predictions may include values in a labeled format.

In embodiments, the labeled format may be BIO notations, which are often used in NER and other sequence labeling tasks, and are a way to represent and classify each input token in a sentence. In the BIO scheme, each token is labeled as the beginning of an entity (B), inside an entity (I), or outside any entity (O). FIG. 3C illustrates an example of a set of input tokens as well as their labeled values in the BIO notation. For example, the set of labels may be "B-ORDERNUMBER", "O", "B-ORDERDATE", "I-ORDERDATE", "B-PRODUCTNAME", "I-PRODUCTNAME", "B-UNITPRICE", "B-QUANTITY", and/or others.

The server computer 215 may perform (238) post-processing functionalities on the outputted token-level predictions. According to embodiments, the server computer 215 may convert the set of predicted values in the labeled format (e.g., BIO notation) into the set of predicted values for a set of defined categories.

In embodiments, the set of defined categories may be in JavaScript Object Notation (JSON) format. For example, the set of defined categories may be 'digitalReceiptOrderStatus', 'digitalReceiptType', 'digitalReceiptOrderNum', 'storeName', 'receiptDate', 'total', 'subtotal', 'taxes', 'product' (including sub-categories such as 'productNumber', 'productDescription', 'unitOfMeasure', 'quantity', 'unitPrice', 'totalPrice', and 'lineNumber'), and/or others. FIG. 3D illustrates an example JSON output with values for a set of defined categories.

Although not depicted in FIG. 2, it should be appreciated that the outputted token-level predictions of (238) and/or the post-processed values for the set of defined categories may be input into the machine learning model, after which the machine learning model may be updated or re-trained to account for this output data. Accordingly, the server computer 215 may use the updated machine learning model in subsequent analysis, which may improve output accuracy and efficiency.

In embodiments, the server computer 215 may incorporate and utilize an additional machine learning model that may be an entity linking model. In particular, the entity linking model may be trained on the same or similar set of training data as discussed with respect to (222). The entity linking model may utilize one or more "heads" in its attention mechanism that may be specifically designed or tuned to recognize and disambiguate entities. That is, for a given set of input data that may be in the form of labeled text on a purchase receipt, the entity linking model may analyze the set of input data to determine how any of the labeled text on the purchase receipt should be grouped into products/services. Because each product/service has different description information (e.g., quantity, product/service number, unit price, etc.), the entity linking model may link together a set of relevant and/or related information for a given product/service. In this regard, the entity linking model may create distinct product/service groups such that no piece of product/service information is applied to more than one product/service group. Further, the entity linking model may thus generate a list of these product/service groups for use in assessing and rewarding digital rewards to users and in performing an aggregated data analysis on digital purchasing habits for a consumer base.

The server computer 215 may assess (240) a digital reward associated with the purchase of the product and/or service. In embodiments, a user who purchased the product and/or service (e.g., the user of the electronic device 205) may earn a specified amount of points for purchasing the product or service, which may be added to a point balance for that user. Further, the user may redeem a given amount of points for one or more rewards including, for example, a gift card, a free or discounted product(s) and/or service(s), a subscription service, contest or sweepstakes entry, exclusive content, real life or virtual experiences, and/or other rewards. For example, a user may purchase a $25 gift card for an online retailer by redeeming 25,000 points.

The server computer 215 may communicate or notify (242) the electronic device 205 of the digital reward. In particular, the server computer 215 may apply the digital reward to an account of the user, and the user may use the electronic device 205 to access the account that reflects the digital reward and/or any other digital rewards earned by the user. Additionally or alternatively, the server computer 215 may generate and transmit a notification or electronic communication to the electronic device 205 or to an email or other type of account of the user, indicating the digital reward.

In embodiments, the server computer 215 may enable one or more individuals to review the results of the machine learning analysis, such as via one or more electronic devices. This functionality may iteratively improve the prediction capabilities of the machine learning model, and may result in improved accuracy and consistency across different retailers, formats, and the like. In these embodiments, the results/outputs from the machine learning model analysis may be visualized (i.e., the textual results will be reproduced as some type of textual and/or graphical content), whereby an individual may review the visualized results and identify any gaps, errors, and/or the like.

In operation, an individual may use an electronic device to flag/mark an error in the output of the machine learning model, and input a correction to the error, where the corrected error may be marked for inclusion in a subsequent set of data that may be used to re-train the machine learning model. Accordingly, when the machine learning model is re-trained using the subsequent set of data, the performance of the machine learning model should improve on instances of data that are similar to the instance that originally produced the error.

Additionally, the server computer 215 may implement fraud detection capabilities, such as to ensure that duplicate digital receipts are not rewarded with duplicate digital rewards. In particular, the server computer 215 may review and analyze multiple outputs to detect whether the outputs indicate duplicate electronic communications (e.g., duplicate digital receipts). The server computer 215 may perform this detection by comparing one or more components (e.g., order date, order number, etc.) of the outputted set of predicted values that may indicate duplicate electronic communications (i.e., duplicate digital receipts) associated with an applicable user. If the server computer 215 detects duplicate electronic communications, the server computer 215 may ensure that only a single digital reward is awarded to the user, such as a single digital reward being applied to the account of the user, and may provide a communication of the same to the user.

FIGS. 3A-3D illustrate processing steps and related data associated with an example product order, in accordance with the present embodiments. It should be appreciated that the information and data as illustrated in FIGS. 3A-3D is exemplary and that other types and formats of data are envisioned.

Figure 3A:
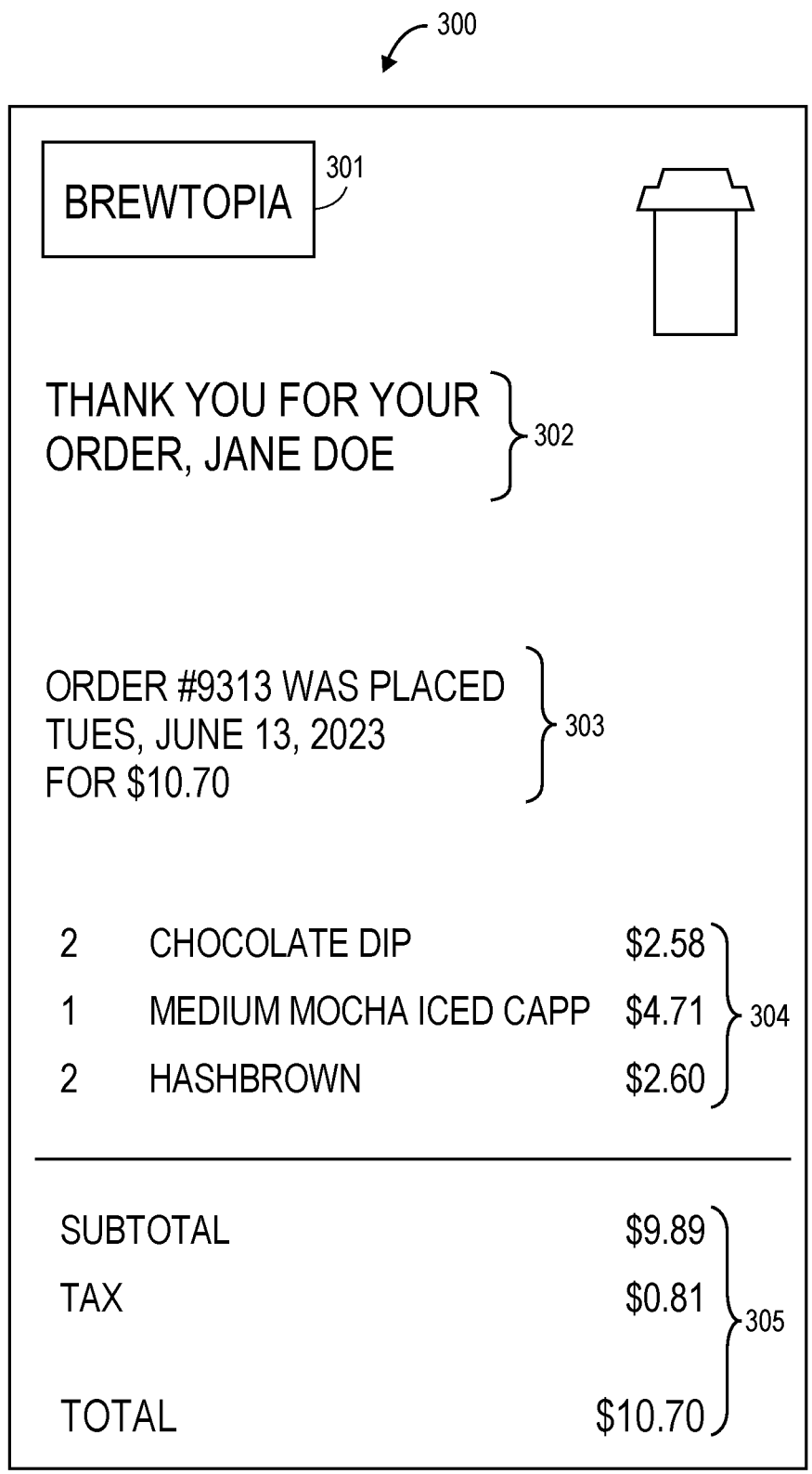

FIG. 3A illustrates an example electronic communication 300 indicating an e-receipt for a product order, where the electronic communication 300 may be in a certain format (e.g., HTML). The electronic communication 300 may indicate a retailer 301 where the products were purchased, a narrative 302 describing the product purchase, a set of order details 303, a set of product details 304, and a set of cost details 305. According to embodiments, a computing device may perform tag processing functionalities as discussed herein, resulting in a set of augmented text input.

FIG. 3B illustrates a set of augmented text input 310 that may result from processing the electronic communication 300. In particular, the set of augmented text input 310 may include various of the information as included in the electronic communication 300, where the information is formatted with a set of tags included therein. In embodiments, the set of tags may include a set of designated tags that respectively replaced certain HTML tags.

FIG. 3C illustrates a set of input tokens 315 that may be generated or compiled from the set of augmented text input 310 of FIG. 3B. Each line included in the set of input tokens 315 may be an individual input token that may be input into a trained machine learning model. FIG. 3C further illustrates a set of token predictions 320 that may be output by the trained machine learning model. Each line included in the set of token predictions 320 may correspond to the respective line in the set of input tokens 315. Further, the set of token predictions 320 may be in a BIO notations format. For example, a subset of input tokens 316 indicating a date that the order was placed may correspond to a subset of token predictions 321 labeled with either "B-ORDERDATE" or "I-ORDERDATE". Further, for example, an input token 317 indicates an order total amount that may correspond to a token prediction 322 labeled with "B-ORDERTOTAL".

To convert the set of token predictions 320 in the BIO notation into a more readable format (e.g., JSON), the set of token predictions 320 may be processed according to the post-processing functionalities discussed herein. FIG. 3D illustrates a post-processing output 325 in JSON format that corresponds to the set of token predictions 320.

The post-processing output 325 may convert at least a portion of the set of token predictions 320 into corresponding key/value pairs. For example, a key/value pair 326 of 'receiptDate': '06/13/2023' may correspond to the subset of token predictions 321 as illustrated in FIG. 3C; and a set of key/value pairs 327 may detail a product that was purchased as part of the order (namely, the medium mocha iced cappuccino). In embodiments, the set of key/value pairs 327 may group the respective quantity and prices of the corresponding product.

Figure 4:
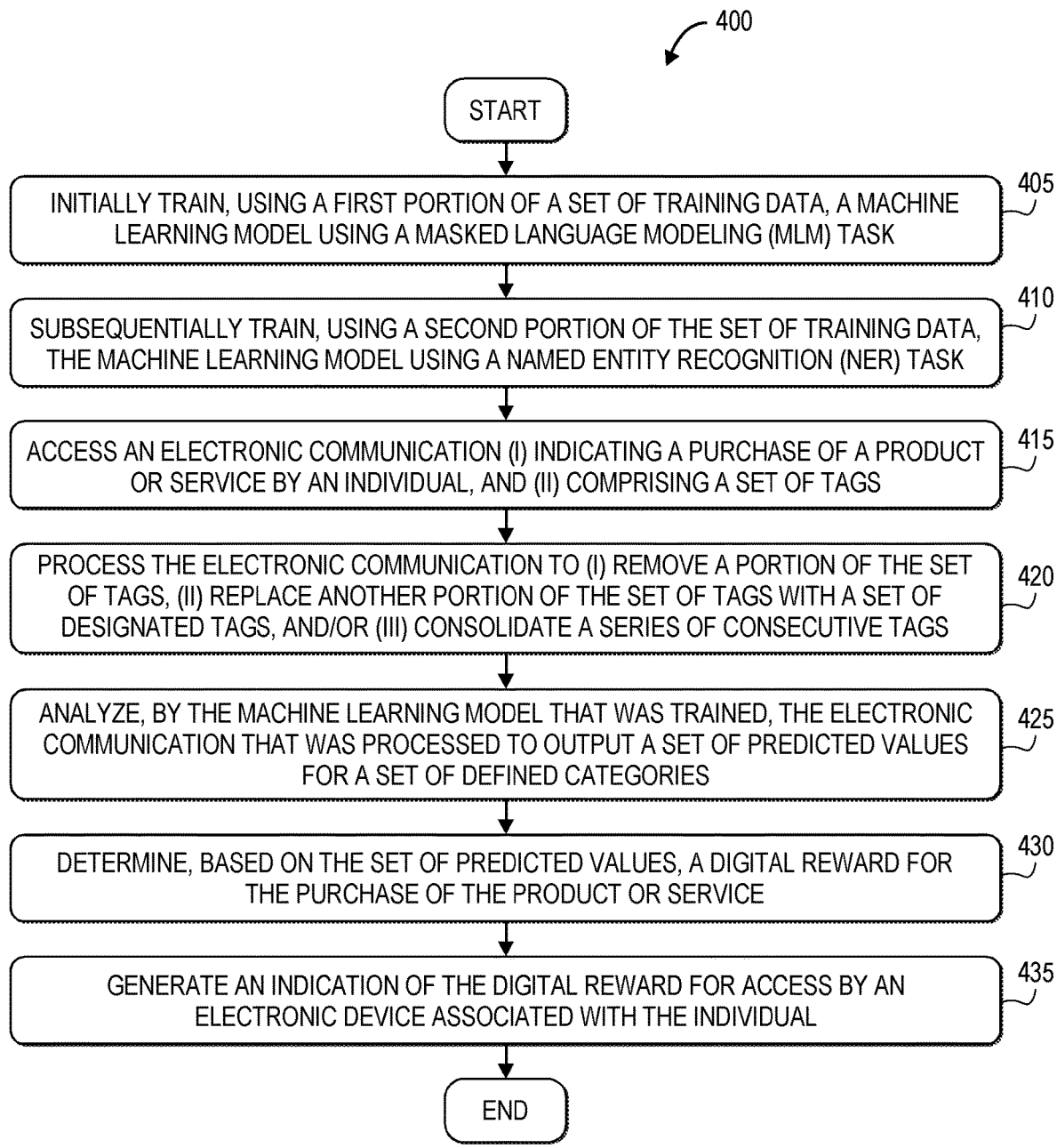
FIG. 4 illustrates an example flow diagram of using machine learning to extract data from electronic communications, in accordance with some embodiments.

FIG. 4 is a block diagram of an example method 400 of using machine learning to extract data from electronic communications. The method 400 may be facilitated by one or more electronic devices (such as the server computer 115 as depicted in FIG. 1A).

The method 400 may begin when the electronic device(s) initially trains (block 405), using a first portion of a set of training data (which may be unlabeled), a machine learning model using an MLM task. In embodiments, the machine learning model may be a language model, and the set of training data may include a set of training electronic communications labeled with a set of training tags. In particular, the set of training data may contain augmented text with the set of designated tags (e.g., as illustrated in 310 of FIG. 3B).

The electronic device(s) may subsequently train (block 410), using a second portion of the set of training data (which may be labeled with predefined categories), the machine learning model using an NER task. In embodiments, the machine learning model may be trained using a transformer architecture. Further, in embodiments, the electronic device(s) may train, using the set of training data, an entity linking model, where the entity linking model may be used to create a set of distinct groups associated with a plurality of products or services.

The electronic device(s) may access (block 415) an electronic communication (i) indicating a purchase of a product or service by an individual, and (ii) comprising a set of tags. In embodiments, the electronic device(s) may receive the electronic communication from an entity from which the individual purchased the product or service.

The electronic device(s) may process (block 420) the electronic communication to (i) remove a portion of the set of tags, (ii) replace another portion of the set of tags with a set of designated tags, and/or (iii) consolidate a series of consecutive tags. In embodiments, each of the portion of the set of tags that is removed may be one of a set of predefined tag types.

The electronic device(s) may analyze (block 425), by the machine learning model that was trained, the electronic communication that was processed to output a set of predicted values for a set of defined categories associated with the purchase of the product or service by the individual. In embodiments, the set of predicted values may be initially output in a labeled format, and the electronic device(s) may convert the set of predicted values in the labeled format into the set of predicted values for the set of defined categories.

The electronic devices(s) may determine (block 430), based on the set of predicted values, a digital reward for the purchase of the product or service. Additionally, the electronic device(s) may generate (block 435) an indication of the digital reward for access by an electronic device associated with the individual. In embodiments, the electronic device(s) may review multiple sets of predicted values for the set of defined categories to determine that duplicate electronic communications associated with the individual were analyzed by the machine learning model, and prevent duplicate digital rewards from being awarded to the individual.

Additionally, in embodiments, the electronic device(s) may avail the set of predicted values for the set of defined categories via an electronic device for review by a user, receive, from the electronic device, a correction to an error included in the set of predicted values for the set of defined categories, and retrain the machine learning model with a subsequent set of data indicating the correction to the error.

Figure 5:
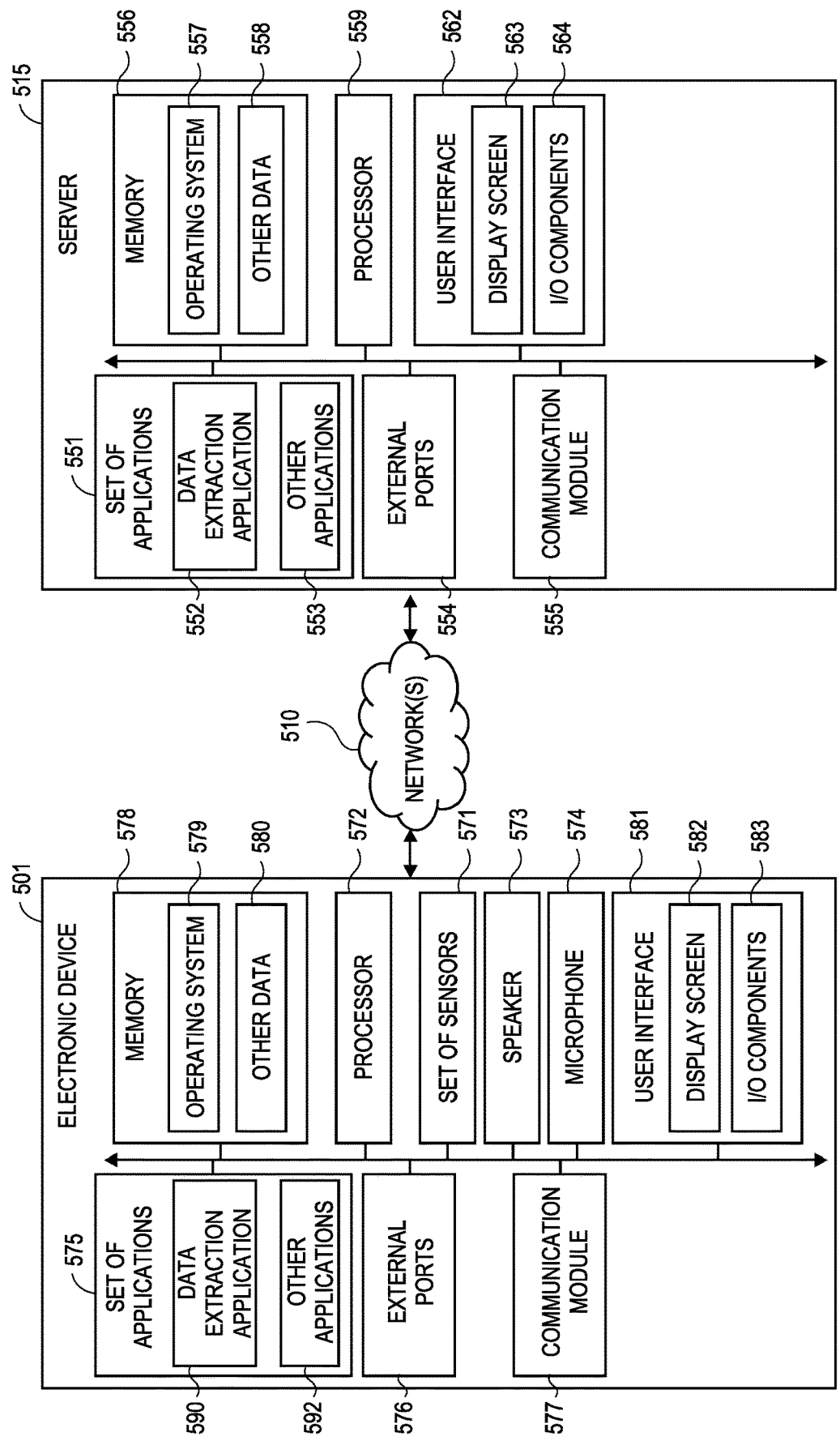
FIG. 5 is an example hardware diagram of an electronic device and a server configured to perform various functionalities, in accordance with some embodiments.

FIG. 5 illustrates a hardware diagram of an example electronic device 501 (e.g., one of the electronic devices 103, 104, 105 as described with respect to FIG. 1A) and an example server 515 (e.g., the server computer 115 as described with respect to FIG. 1A), in which the functionalities as discussed herein may be implemented. It should be appreciated that the components of the electronic device 501 and the server 515 are merely exemplary, and that additional or alternative components and arrangements thereof are envisioned.

The electronic device 501 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be a data extraction application 590, such as to access various data, train machine learning models, and analyze data using the machine learning models. It should be appreciated that one or more other applications 592 are envisioned.

The processor 572 may interface with the memory 578 to execute the operating system 579 and the set of applications 575. According to some embodiments, the memory 578 may also store other data 580, such as machine learning model data and/or other data such as product data, digital reward data, account data, and/or other data that may be used in the analyses and determinations as discussed herein. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 501 may further include a communication module 577 configured to communicate data via one or more networks 510. According to some embodiments, the communication module 577 may include one or more transceivers (e.g., WAN, WWAN, WLAN, and/or WPAN transceivers) functioning in accordance with IEEE standards, 3GPP standards, or other standards, and configured to receive and transmit data via one or more external ports 576.

The electronic device 501 may include a set of sensors 571 such as, for example, a location module (e.g., a GPS chip), an image sensor, an accelerometer, a clock, a gyroscope (i.e., an angular rate sensor), a compass, a yaw rate sensor, a tilt sensor, telematics sensors, and/or other sensors. The electronic device 501 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, and/or built in or external keyboard). Additionally, the electronic device 501 may include a speaker 573 configured to output audio data and a microphone 574 configured to detect audio.

In some embodiments, the electronic device 501 may perform the functionalities as discussed herein as part of a "cloud" network or may otherwise communicate with other hardware or software components within the cloud to send, retrieve, or otherwise analyze data.

As illustrated in FIG. 5, the electronic device 501 may communicate and interface with the server 515 via the network(s) 510. The server 515 may include a processor 559 as well as a memory 556. The memory 556 may store an operating system 557 capable of facilitating the functionalities as discussed herein as well as a set of applications 551 (i.e., machine readable instructions). For example, one of the set of applications 551 may be a data extraction application 552, such as to access various product data, train machine learning models, and analyze data using the machine learning models. It should be appreciated that one or more other applications 553 are envisioned.

The processor 559 may interface with the memory 556 to execute the operating system 557 and the set of applications 551. According to some embodiments, the memory 556 may also store other data 558, such as machine learning model data and/or other data such as product data, digital reward data, account data, and/or other data that may be used in the analyses and determinations as discussed herein. The memory 556 may include one or more forms of volatile and/or nonvolatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 515 may further include a communication module 555 configured to communicate data via the one or more networks 510. According to some embodiments, the communication module 555 may include one or more transceivers (e.g., WAN, WWAN, WLAN, and/or WPAN transceivers) functioning in accordance with IEEE standards, 3GPP standards, or other standards, and configured to receive and transmit data via one or more external ports 554.

The server 515 may further include a user interface 562 configured to present information to a user and/or receive inputs from the user. As shown in FIG. 5, the user interface 562 may include a display screen 563 and I/O components 564 (e.g., ports, capacitive or resistive touch sensitive input panels, keys, buttons, lights, LEDs, external or built in keyboard). According to some embodiments, the user may access the server 515 via the user interface 562 to review information, make selections, and/or perform other functions.

In some embodiments, the server 515 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 572, 559 (e.g., working in connection with the respective operating systems 579, 557) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of using machine learning to extract data from electronic communications, the computer-implemented method comprising:

initially training, by at least one processor using a masked language modeling task and a set of training data, a machine learning model, wherein the set of training data comprises a set of training electronic communications labeled with a set of training designated Hyper-Text Markup Language (HTML) tags that define how content included in the set of training electronic communications should be displayed, wherein the content identifies or describes purchased products or services;

further training, by the at least one processor using a named entity recognition task and a task-specific training dataset, the machine learning model, wherein the task-specific training dataset identifies a set of pre-defined labels associated with the purchased products or services;

training, by the at least one processor using the set of training data, an entity linking model;

creating, using the entity linking model that was trained, a set of distinct groups associated with the purchased products or services;

accessing, by the at least one processor, an electronic communication indicating a purchase of a product or service by an individual;

parsing, by the at least one processor, the electronic communication to extract, from the electronic communication, a set of HTML tags that define how content included in the electronic communication should be displayed;

generating, by the at least one processor, a series of input tokens, including: identifying (i) a portion of the set of HTML tags to remove, and (ii) another portion of the set of HTML tags to replace with a set of designated HTML tags, removing the portion of the set of HTML tags from the set of HTML tags, replacing the another portion of the set of HTML tags with the set of designated HTML tags, and consolidating consecutive HTML tags included in the set of designated HTML tags that replaced the another portion of the set of HTML tags, wherein (i) the removing and replacing enables at least some information to be preserved and enables the machine learning model to learn from different formats of different electronic communications, and (ii) the series of input tokens results from the removing, replacing, and consolidating;

analyzing, by the machine learning model that was trained, the series of input tokens to output a set of token-level predictions respectively corresponding to at least some of the series of input tokens, wherein each of the set of token-level predictions is in a labeled format;

for each token-level prediction in the set of token-level predictions, converting, by the at least one processor, that token-level prediction into a predicted value for a defined category, of a set of defined categories, associated with the purchase of the product or service by the individual; and determining, by the at least one processor based on (i) the set of predicted values for the set of defined categories, and (ii) the set of distinct groups created using the entity linking model, a digital reward for the purchase of the product or service by the individual.

2. The computer-implemented method of claim 1, wherein the machine learning model is a language model, and wherein initially training the machine learning model comprises:

initially training, by the at least one processor using the masked language modeling task and the set of training data, the language model using a transformer architecture.

3. The computer-implemented method of claim 1, wherein each of the portion of the set of HTML tags that is removed is one of a set of predefined tag types.

4. The computer-implemented method of claim 1, further comprising:

generating an indication of the digital reward for access by an electronic device associated with the individual.

5. The computer-implemented method of claim 4, further comprising:
reviewing, by the at least one processor, multiple sets of predicted values for the set of defined categories to determine that duplicate electronic communications associated with the individual were analyzed by the machine learning model; and
preventing, by the at least one processor, duplicate digital rewards from being awarded to the individual.

6. The computer-implemented method of claim 1, further comprising:
availing, by the at least one processor, the set of predicted values for the set of defined categories via an electronic device for review by a user;
receiving, by the at least one processor from the electronic device, a correction to an error included in the set of predicted values for the set of defined categories; and
retraining, by the at least one processor, the machine learning model with a subsequent set of data indicating the correction to the error.

7. A system for using machine learning to extract data from electronic communications, comprising:
a memory storing a set of computer-readable instructions and a machine learning model; and
one or more processors interfaced with the memory, and configured to execute the set of computer-readable instructions to cause the one or more processors to:
initially train, using a masked language modeling task and a set of training data, the machine learning model, wherein the set of training data comprises a set of training electronic communications labeled with a set of training designated HyperText Markup Language (HTML) tags that define how content included in the set of training electronic communications should be displayed, wherein the content identifies or describes purchased products or services,
further train, using a named entity recognition task and a task-specific training dataset, the machine learning model, wherein the task-specific training dataset identifies a set of predefined labels associated with the purchased products or services,
train, using the set of training data, an entity linking model,
create, using the entity linking model that was trained, a set of distinct groups associated with the purchased products or services,
access an electronic communication indicating a purchase of a product or service by an individual,
parse the electronic communication to extract, from the electronic communication, a set of HTML tags that define how content included in the electronic communication should be displayed,
generate a series of input tokens, including:
identify (i) a portion of the set of HTML tags to remove, and (ii) another portion of the set of HTML tags to replace with a set of designated HTML tags,
remove the portion of the set of HTML tags from the set of HTML tags,
replace the another portion of the set of HTML tags with the set of designated HTML tags, and
consolidate consecutive tags included in the set of designated HTML tags that replaced the another portion of the set of HTML tags, wherein (i) the removing and replacing enables at least some information to be preserved and enables the machine learning model to learn from different formats of different electronic communications, and (ii) the series of input tokens results from the removing, replacing, and consolidating,
analyze, by the machine learning model that was trained, the series of input tokens to output a set of token-level predictions respectively corresponding to at least some of the series of input tokens, wherein each of the set of token-level predictions is in a labeled format,
for each token-level prediction in the set of token-level predictions, convert that token-level prediction into a predicted value for a defined category, of a set of defined categories, associated with the purchase of the product or service by the individual, and
determine, based on (i) the set of predicted values for the set of defined categories, and (ii) the set of distinct groups created using the entity linking model, a digital reward for the purchase of the product or service by the individual.

8. The system of claim 7, wherein each of the portion of the set of HTML tags that is removed is one of a set of predefined tag types.

9. The system of claim 7, wherein the one or more processors is configured to execute the set of computer-readable instructions to further cause the one or more processors to:
generate an indication of the digital reward for access by an electronic device associated with the individual.

10. A non-transitory computer-readable storage medium configured to store instructions executable by one or more processors, the instructions comprising:
instructions for initially training, using a masked language modeling task and a set of training data, a machine learning model, wherein the set of training data comprises a set of training electronic communications labeled with a set of training designated Hyper Text Markup Language (HTML) tags that define how content included in the set of training electronic communications should be displayed, wherein the content identifies or describes purchased products or services;
instructions for further training, using a named entity recognition task and a task-specific training dataset, the machine learning model, wherein the task-specific training dataset identifies a set of predefined labels associated with the purchased products or services:
instructions for training, using the set of training data, an entity linking model: instructions
for creating, using the entity linking model that was trained, a set of distinct groups associated with the purchased products or services:
instructions for accessing an electronic communication indicating a purchase of a product or service by an individual;
instructions for parsing the electronic communication to extract, from the electronic communication, a set of HTML tags that define how content included in the electronic communication should be displayed;
instructions for generating a series of input tokens, including:
instructions for identifying (i) a portion of the set of HTML tags to remove, and (ii) another portion of the set of HTML tags to replace with a set of designated HTML tags, instructions for removing the portion of the set of HTML tags from the set of HTML tags, instructions for replacing the another portion of the set of HTML tags with the set of designated HTML tags, and instructions for consolidating consecutive tags included in the set of designated HTML tags that replaced the another portion of the set of HTML tags wherein (i) the removing and replacing enables at least some visually rich information to be preserved and enables the machine learning model to learn from different formats of different electronic communications, and (ii) the series of input tokens results from the removing, replacing, and consolidating;

instructions for analyzing, by the machine learning model that was trained, the series of input tokens to output a set of token-level predictions respectively corresponding to at least some of the series of input tokens, wherein each of the set of token-level predictions is in a labeled format;

instructions for, for each token-level prediction in the set of token-level predictions, converting that token-level prediction into a predicted value for a defined category, of a set of defined categories, associated with the purchase of the product or service by the individual and instructions for determining, based on (i) the set of predicted values for the set of defined categories, and (ii) the set of distinct groups created using the entity linking model, a digital reward for the purchase of the product or service by the individual.

\* \* \* \* \*